(12) United States Patent
Bertani

(10) Patent No.: US 7,959,026 B2
(45) Date of Patent: Jun. 14, 2011

(54) VENT CAP FOR OIL TANKS OF MACHINES AND THE LIKE EQUIPPED WITH SPLASH GUARD

(75) Inventor: Alberto Bertani, Milan (IT)

(73) Assignee: Elesa S.p.A., Milan (IT)

( * ) Notice: Subject to any disclaimer, the term of this patent is extended or adjusted under 35 U.S.C. 154(b) by 1150 days.

(21) Appl. No.: 11/624,706

(22) Filed: Jan. 19, 2007

(65) Prior Publication Data

US 2007/0170186 A1      Jul. 26, 2007

(30) Foreign Application Priority Data

Jan. 20, 2006   (IT) .............................. MI20060019 U

(51) Int. Cl.
*B65D 51/16*   (2006.01)
(52) U.S. Cl. ........ 220/373; 215/370; 215/902; 220/303; 220/374; 220/DIG. 32; 220/DIG. 33
(58) Field of Classification Search .................. 215/370, 215/902; 220/303, 373, 374, DIG. 32, DIG. 33
See application file for complete search history.

(56) References Cited

U.S. PATENT DOCUMENTS

| | | | | |
|---|---|---|---|---|
| 3,385,467 A | * | 5/1968 | Lindenberg | 220/374 |
| 4,113,925 A | * | 9/1978 | Kohler et al. | 429/78 |
| 4,392,584 A | * | 7/1983 | Bauer | 220/374 |
| 5,730,183 A | * | 3/1998 | Kremsler | 137/493.8 |
| 6,173,855 B1 | * | 1/2001 | Stark | 220/295 |

* cited by examiner

*Primary Examiner* — Anthony Stashick
*Assistant Examiner* — Elizabeth Volz
(74) *Attorney, Agent, or Firm* — Pearne & Gordon LLP

(57) ABSTRACT

The invention concerns a vent cap for oil tanks of machines and motor equipment, comprising a cup (1), equipped with means of engagement (4) with the seat of the tank filler, and a lid (12) mounted on the cup and which snaps thereon. Between the cup (1) and the lid (12) there is a gap allowing the vapor outflow from the tank to the outer environment or viceversa. According to the invention, said lid (12) comprises two cylindrical diaphragms (12b, 12c), concentric to the cap axis and which, in cooperation with the cup (1), form labyrinth means for the flow of vapors and air. Cup (1) also carries a guide (7) supporting a level rod (8), consisting of a central, cylindrical main body (7b), wherefrom ribs (7a) for anchoring to the cup (1) depart. Guide (7) extends, at the top, into two flexible flaps (7c), provided with means of engagement (10) of the rod (8).

11 Claims, 2 Drawing Sheets

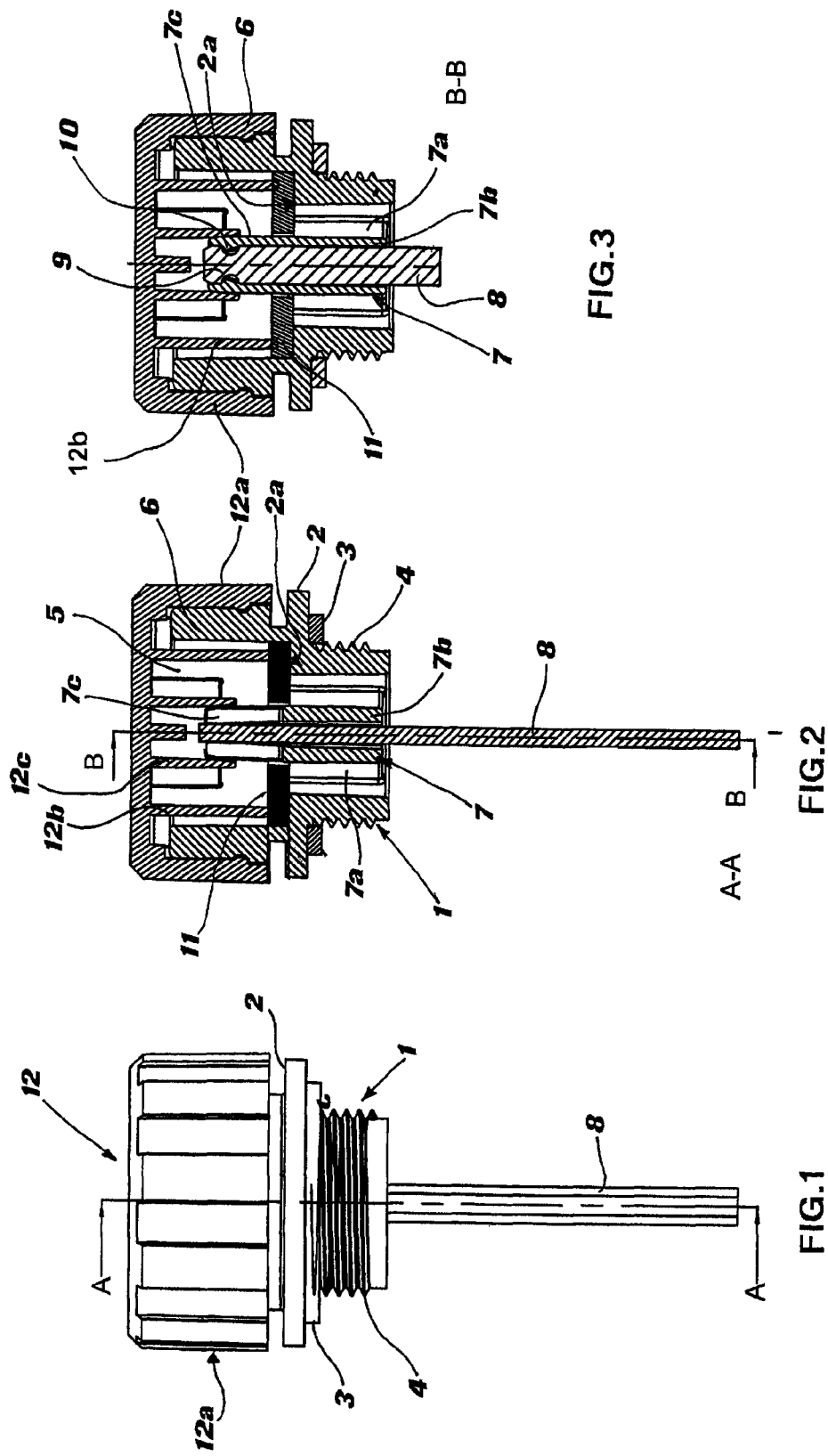

VENT CAP FOR OIL TANKS OF MACHINES AND THE LIKE EQUIPPED WITH SPLASH GUARD

The present invention concerns a vent cap for oil tanks of machines, motor equipment and the like.

It has long been known to arrange, on certain types of machines and motor equipment, filler caps of oil tanks which allow to keep the inner pressure of the tanks at the same level as the outer pressure, and which are known as vent caps. This kind of cap allows the free emission from the oil tanks of part of the developing vapours, and dramatically reduces the build up of condensation through the introduction of wet air into the tanks Moreover, such kind of caps causes the absence of vacuum or overpressures which may damage gaskets and/or other members found within the tank.

However, since the oil in the tanks of machinery often undergoes violent turbulence, easily splashing against the tank walls and consequently against the vent cap walls, small amounts of oil may easily leak out of the cap, causing dispersions, which may pose a hazard due to the possible environmental impact thereof. Moreover, these leaks in any case obviously reduce the amount of oil inside the tank, with the risk—in the long run of the residual quantity no longer being sufficient for the required functions, and moving members hence possibly becoming damaged.

Various ways have been devised to provide the vent caps with means capable of limiting or deviating oil leaks. In particular, italian utility model no. 173 511 in the name of the same Applicant concerns a vent cap simply consisting of a threaded cup and of a snap-on lid mounted on said cup and integral in rotation therewith, wherein two splash guard diaphragms are provided on the upper portion of the cup, in a mutually opposite position and inclination, as well as a porous filter arranged at the top of the cup chamber, in order to selectively filter water vapours and oil vapours. The splash guard diaphragms also carry a rib to support a level rod.

The finding according to the above-said invention brilliantly solves some problems of the known art. However, during use it has been detected that the cap thus shaped still has some minor drawbacks. In particular, the splash guard diaphragms thus arranged are not sufficient to stop the oil flow, which often touches the porous filter, and leaks from the chamber.

Secondly, the cap according to the above-said invention requires to mould multiple, separate components, and to mount them at a later stage. In particular, the positioning of the level rod, keying it into a suitable seat on the diaphragm, still implies unsafe mounting, with the consequent risk of detachment. Finally, as can be easily understood, a similar operation is often very time-consuming.

The object of the present invention is to manufacture a cap with a level rod which has a simple construction, is capable of eliminating oil leaks therefrom and at the same time provides a fixed and secure rod anchoring system.

Such object is achieved by the cap described in claim 1). Other particularly preferred features of the invention are detailed in the dependent claims.

The cap according to the invention will now be described, with reference to a particular variant thereof, as it is illustrated in the drawings, wherein:

FIG. 1 is a side view of the cap according to the invention, whereof

FIG. 2 is an axial section view according to the line A-A of FIG. 1;

FIG. 3 is a view similar to FIG. 2, in an axial section according to the line B-B of FIG. 2;

Figure 6:
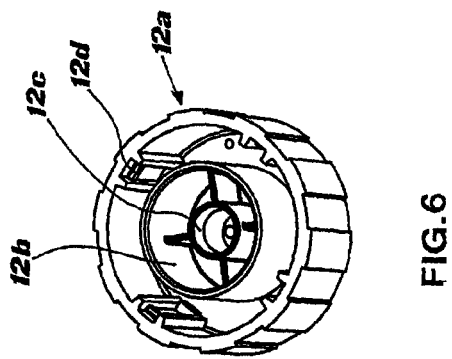
FIG. 6 is a bottom perspective view of the lid only.

The cap according to the invention comprises a substantially cylindrical cup 1, which has an outer abutment 2, provided below with a gasket 3, below which there is a male-threaded spigot 4, capable of engaging with the female-threaded seat of the filler (not shown) of the oil tank for which the cap is intended. Above, cup 1 builds a chamber 5 limited sideways by a cylindrical wall 6 and below by an inner abutment 2a opposed to outer abutment 2.

Inside cup 1 and anchored thereto by four integrally-moulded, radial ribs 7a, there is provided a support guide 7 for a level rod 8, arranged in the middle of the cup. Guide 7 consists of an essentially cylindrical main body 7b, wherefrom ribs 7a depart and at the top whereof two flexible flaps 7c are provided. Guide 7 is internally shaped to ease the insertion and stable positioning of level rod 8; in particular, it is provided to obtain inside said base 7b and along flaps 7c, a pair of grooves, diametrically opposite to a diameter perpendicular to the gap which divides the two flaps 7c (see in particular FIG. 4).

Moreover, rod 8 has, near the top, two symmetrical and opposite recesses 9, capable of engaging with a pair of teeth 10 formed at the top of flaps 7c and facing inwards.

In order to ease insertion, it is provided that the head of rod 8 is rounded, so as to act as a bevel for the engagement of recesses 9 with teeth 10. In turn, flaps 7c of guide 7 are manufactured, as said, with a sufficiently elastic material so as to allow the temporary spreading apart thereof, for the insertion of the rod, and the subsequent closure once teeth 10 have been engaged with recesses 9.

On inner abutment 2a, between spigot 4 and wall 6, which forms a plane shaped essentially like a circular crown, a porous filter 11 known per se is supported for the selective flow of vapours.

As a covering of the cup and of the inner structure thereof described so far, a lid 12 is applied, which comprises a lateral side wall 12a for the engagement with the outer surface of wall 6.

Figure 4:
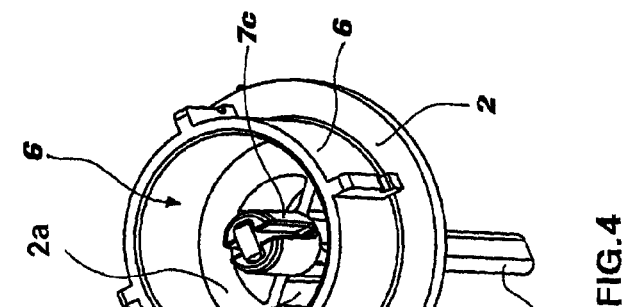
FIG. 4 is a top perspective view of the cup portion only of the cap according to the invention, with the level rod mounted.
Figure 5:
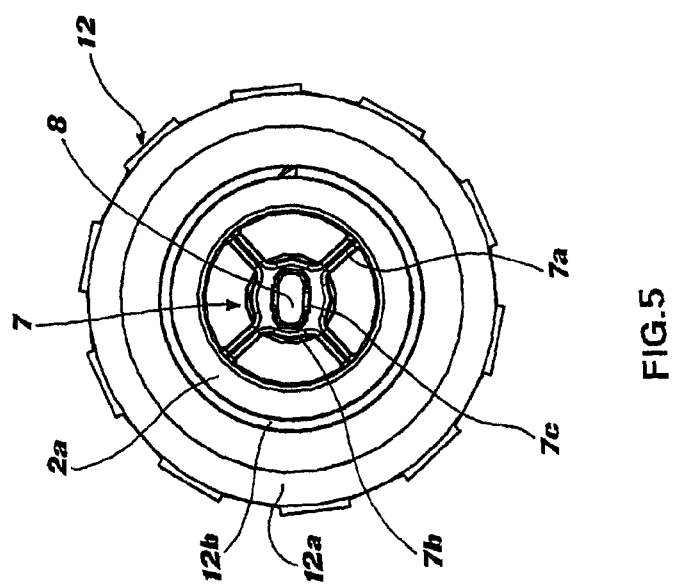
FIG. 5 is a bottom view of the lid portion only of the cap according to the invention.

In actual fact, and as is evident from FIG. 4, wall 6 is relatively thin and has radial ribs 14, wherewith the wall 12a of lid 12 engages.

Wall 12a has, along the inner perimeter thereof, engagement protrusions 12d, to allow the fixed and stable engagement with recesses 13 obtained along ribs 14. The engagement between the protrusions of wall 12a and recesses 13 thus allows to manufacture the actual cap structure.

Inside said lid, and freely abutting downwards from the upper surface thereof, there are further provided two cylindrical diaphragms 12b and 12c (see also FIG. 6) which are concentric and parallel to said wall 12a.

Diaphragm 12b extends from the top wall of the lid to porous filter 11, and lightly compresses it (as highlighted in FIGS. 2 and 3) above inner abutment 2a, with the lower end thereof. The result is a division of chamber 5 into two volumes: a volume outside diaphragm 12b, forming a channel between diaphragm 12b and wall 6 and between the top of such wall 6 and the inner upper surface of lid 12, and an inner volume formed between diaphragm 12b and diaphragm 12c, respectively. Thereby, a labyrinth is formed for the selective flow of the vapours, since—as can be well understood— diaphragm 12*b* acts as an actual partition, allowing the outflow of vapours from chamber 5 only through porous filter 11.

It must also be noted that, through the labyrinth thus created, the oil splashes which may accidentally reach chamber 5 could in no way cause the leak of oil drops from the cap: as a matter of fact, as can be easily observed in the drawing, the labyrinth is now shaped so that the exit of the vapours through the filter is oriented at 90° to the direction of any splashes, so that, even if large amounts of oil arrived at chamber 5, they would collide with the wall of diaphragm 12*b* and of the inner upper surface of the lid between diaphragms 12*b* and 12*c*, and they would hence be guided into the underlying chamber.

Moreover, during the operation tests it has been detected that the arrangement of filter 11, inside chamber 5 and in engagement with diaphragm 12*b*, produces the remarkable result of a stationary and, at the same time, "self-cleaning" filter. As a matter of fact, given the particular arrangement of the labyrinth, the oil entering the cap chamber, in order to return to the main tank, also flushes the filter, removing any debris deposited thereon, cleaning it.

As can be easily understood, the combination of these two features allows the cap to have a much longer life than known-art caps.

It is evident that the main object of the invention has thus been achieved, dramatically reducing the amount of oil which clogs the filter, and consequently virtually eliminating the amount of oil which may penetrate in the labyrinth and escape into the environment.

Moreover, diaphragm 12*c* has a diameter sufficient to act as a housing for the two flaps 7*c* of guide 7. In particular, once rod 8 is in a stationary position and lid 12 engages with the cup, diaphragm 12*c* engages with the flaps 7*c* of guide 7, which engages therewith and tightly inside the cup formed by diaphragm 12*c*. This immediately implies the tightening of flaps 7*c* against level rod 8, and hence also the locking of rod 8 in position.

Diaphragm 12*c* thereby guarantees a further protection for a precise and accurate anchoring of rod 8 to the cap body, thereby allowing to achieve the set object of manufacturing a fixed and safe locking device of level rod 8 inside the cap, with an extremely simple structure of the assembly.

The mounting of the parts making up the cap according to the invention, as can be clearly understood from the preceding description, is remarkably simple. The operator inserts level rod 8 into guide 7 until the snap of teeth 10 engaging with recesses 9 can be heard. At that point, after having checked that the porous filter is precisely housed in position, he introduces lid 12 so that the two diaphragms 12*b* and 12*c* and outer wall 12*a* are in the correct position and imparts a pressure sufficient to engage it with the recesses 13 provided on ribs 14 for that purpose.

At this point, the cap is ready to be mounted on the machine, or on the piece of equipment, by the simple screwing of spigot 4 on the oil tank filler.

It is understood that the variant described above is only one of the possible embodiments of the present invention and that a number of variants are possible which do not depart from the scope of protection defined by the accompanying claims.

The invention claimed is:

1. Vent cap for oil tanks of machines and motor equipment, comprising:
    a cup (1), equipped with means of engagement (4) with a housing of a tank filler, said cup (1) carries a guide (7) supporting a level rod (8), said guide (7) has a main central, cylindrical body (7*b*), wherefrom ribs (7*a*) for anchoring to the cup (1) depart, at the top of the main, central cylindrical body (7*b*) there are provided flexible supporting flaps (7*c*) carrying means of engagement (10) of the level rod,
    a lid (12) mounted on the top of the cup and which snaps thereon, integral in the movement thereof, including an outermost cylindrical diaphragm (12*b*) and an innermost cylindrical diaphragm (12*c*), concentric to the cap axis and which, when cooperating with the cup (1), define labyrinth elements that allow only for the flow of vapours and air
    a gap being provided between the cup (1) and the lid (12) allowing the outflow of the vapours found in said tank, wherein said supporting flaps (7*c*) are two, opposite, and may be elastically spread apart.

2. Vent cap as claimed in claim 1, wherein each of said means of engagement (10) of the supporting flaps consists of a single tooth.

3. Vent cap as claimed in claim 1, wherein each of said means of engagement (10) of the supporting flaps consists of a saw-tooth surface.

4. Vent cap as claimed in claim 1, wherein said rod (8) provides bevellings at the top thereof and recesses (9) for the engagement of said means of engagement (10) of the supporting flaps (7*c*).

5. Vent cap as claimed in claim 1, wherein the cup (1) includes a radial rib (14) for engaging the lid (12).

6. Vent cap as claimed in claim 5, wherein the lid (12) includes a protrusion (12*d*) for engaging the radial rib (14).

7. Vent cap for oil tanks of machines and motor equipment, comprising:
    a cup (1), equipped with means of engagement (4) with a housing of a tank filler, said cup (1) carries a guide (7) supporting a level rod (8), said guide (7) has a main central, cylindrical body (7*b*), wherefrom ribs (7*a*) for anchoring to the cup (1) depart, at the top of the main, central cylindrical body (7*b*) there are provided flexible supporting flaps (7*c*) carrying means of engagement (10) of the level rod,
    a lid (12) mounted on the top of the cup and which snaps thereon, integral in the movement thereof, including an outermost cylindrical diaphragm (12*b*) and an innermost cylindrical diaphragm (12*c*), concentric to the cap axis and which, when cooperating with the cup (1), define labyrinth elements that allow only for the flow of vapours and air,
    a gap being provided between the cup (1) and the lid (12) allowing the outflow of the vapours found in said tank, wherein the innermost cylindrical diaphragm (12*c*) of said lid (12) forms a means of engagement and tightening of said supporting flaps (7*c*).

8. Vent cap for oil tanks of machines and motor equipment, comprising:
    a cup (1), equipped with means of engagement (4) with a housing of a tank filler, said cup (1) carries a guide (7) supporting a level rod (8), said guide (7) has a main central, cylindrical body (7*b*), wherefrom ribs (7*a*) for anchoring to the cup (1) depart, at the top of the main, central cylindrical body (7*b*) there are provided flexible supporting flaps (7*c*) carrying means of engagement (10) of the level rod,
    a lid (12) mounted on the top of the cup and which snaps thereon, integral in the movement thereof, including an outermost cylindrical diaphragm (12*b*) and an innermost cylindrical diaphragm (12*c*), concentric to the cap axis and which, when cooperating with the cup (1), define labyrinth elements that allow only for the flow of vapours and air, a gap being provided between the cup (1) and the lid (12) allowing the outflow of the vapours found in said tank, wherein said cup (1) consists of two parts, a lower part having a smaller diameter, forming a threaded spigot (4) for engagement with the oil tank filler, and an upper part having a larger diameter, forming a chamber (5) for housing said labyrinth elements.

9. Vent cap as claimed in claim 4, wherein between said lower and upper parts of the cup (1) there is formed an inner abutment (2*a*) supporting a porous filter (11).

10. Vent cap as claimed in claim 9, wherein said porous filter (11) is tightened against said inner abutment (2*a*) by the lower edge of the outermost cylindrical diaphragm (12*b*).

11. Vent cap as claimed in claim 9, wherein said cup (1) and said guide (7) supporting the rod (8) are made of a single block of moulded thermoplastic material.

\* \* \* \* \*

UNITED STATES PATENT AND TRADEMARK OFFICE
CERTIFICATE OF CORRECTION

| | | |
|---|---|---|
| PATENT NO. | : 7,959,026 B2 | Page 1 of 1 |
| APPLICATION NO. | : 11/624706 | |
| DATED | : June 14, 2011 | |
| INVENTOR(S) | : Bertani | |

It is certified that error appears in the above-identified patent and that said Letters Patent is hereby corrected as shown below:

In Column 5, Claim 9, line 8, please delete "4" and insert therefor --8--.

Signed and Sealed this
Thirteenth Day of September, 2011

David J. Kappos
*Director of the United States Patent and Trademark Office*